(12) United States Patent
Yoshida et al.

(10) Patent No.: US 7,530,856 B2
(45) Date of Patent: May 12, 2009

(54) ELECTRIC JUNCTION BOX

(75) Inventors: Masaoki Yoshida, Shizuoka (JP); Shun Takemoto, Shizuoka (JP); Manabu Matsumoto, Aichi (JP); Akihiro Fuseya, Aichi (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/798,925

(22) Filed: May 17, 2007

(65) Prior Publication Data
US 2007/0270033 A1 Nov. 22, 2007

(30) Foreign Application Priority Data
May 17, 2006 (JP) ............................. 2006-138248

(51) Int. Cl.
*H01R 13/502* (2006.01)
(52) U.S. Cl. ..................................................... 439/701
(58) Field of Classification Search ................. 439/701, 439/949, 76.2
See application file for complete search history.

(56) References Cited

U.S. PATENT DOCUMENTS 5,378,173 A * 1/1995 Hashizawa .................. 439/701
6,739,889 B1 * 5/2004 Daggett et al. .............. 439/157

FOREIGN PATENT DOCUMENTS

JP 2000-23331 1/2000
JP 2004-312793 11/2004

* cited by examiner

*Primary Examiner*—Ross N Gushi
(74) *Attorney, Agent, or Firm*—Kratz, Quintos & Hanson, LLP

(57) ABSTRACT

An electric junction box is provided, by which the cassette block, which mounts the electric components, can be easily attached to between the partition walls of the box body. The electric junction box includes: a box body including a frame-shaped body part and a partition wall partitioning a space within the body part; a cassette block which is received in between the partition walls of the box body so as to be attached to the box body; and a connecting part which connects ends of the partition walls adjacent to each other.

3 Claims, 5 Drawing Sheets

ELECTRIC JUNCTION BOX

BACKGROUND OF THE INVENTION (1) Field of the Invention

The present invention relates to an electric junction box to be mounted on a motor vehicle and so on as a mobile unit.

(2) Description of the Related Art

A motor vehicle as a mobile unit is generally equipped with various electronic equipment, that is, lamps such as a head lamp and tail lamp, and motors such as a starter motor and motor for an air-conditioner.

In order to supply electric power to the various electronic equipment, a junction block has been arranged at a suitable position in the motor vehicle. The junction block is composed of various electric circuit units such as many fuses and relays.

In this connection, since the junction block may include fuses, relays, busbars and so on, therefore it may be called a fuse block, relay box or electric junction box as a generic term. In this specification, such a fuse block, relay box or junction block is called an electric junction box as a generic term.

An electric junction box includes a box body, which forms an external form, an electric block to be attached to the box body, and so on. The box body is formed in a box-shape. The electric block includes: an electric component to be attached to the box body such as a fuse and relay; and a terminal fitting attached to an end of an electric wire.

The terminal fitting is attached to the box body so as to be connected electrically and mechanically to a terminal of an electric component attached to the box body. The terminal fitting electrically connects the electric wire to the electric component. The electric wire attached to the terminal fitting is connected to the electric component. The electric junction box having a construction described above electrically connects the electric wire attaching the terminal fitting to the electric component such as a relay and fuse in accordance with a predetermined pattern.

The terminal fitting attached to the electric wire and the electric component such as a fuse and relay are attached to the box body one by one, so that the electric junction box is assembled. Therefore, a time and man-hour required to assemble the junction box tend to increase.

In order to solve the above problem, proposed is an electric junction box, in which the box body is formed in a frame-shape so as to provide a cassette block detachable to the box body, and the terminal fitting, relay and fuse are mounted in the cassette block (for example, see Japanese Patent Application Laid-Open No. 2004-312793 and Japanese Patent Application Laid-Open No. 2000-23331). In the electric junction box disclosed in these Patent Publication, the box body is provided with a frame-shaped body part and a partition wall for partitioning the inside of the body part into a plurality of spaces, and the terminal fitting and the electric component such as relay and fuse are mounted in the cassette block, and the cassette block is received in between the partition walls so as to attached to the box body, so that the terminal fitting and the electric component such as relay and fuse can be collectively mounted in the box body. As a result, the electric junction box disclosed in these Patent Publication restricts a time and man-hour required to assemble the junction box.

The cassette block is received in between the partition walls adjacent to each other in the box body of the electric junction box disclosed in the above Patent Publication. The box body is made of electrically insulating synthetic resin and molded by known injection molding.

Therefore, as for the box body described above, when the number of electric components increases or a size of the electric component increases, a distance between the partition walls is increased, causing deterioration in stiffness of the box body. Therefore, when the cassette block is inserted into between the partition walls, the box body tends to be deformed, resulting in that the cassette block is hardly inserted into between the partition walls.

Moreover, since the box body described above is made of synthetic resin and molded by known injection molding, the box body tends to be deformed upon injection molding or when the molded product is taken out from a mold, since the body part of the box body is formed in a frame-shape. In this case as well, of course, the cassette block is hardly inserted into between the partition walls.

SUMMARY OF THE INVENTION

It is therefore an objective of the present invention to solve the above problem and to provide an electric junction box, by which the cassette block, which mounts the electric components, can be easily attached to between the partition walls of the box body.

In order to attain the above objective, the present invention is to provide an electric junction box including: a box body including a frame-shaped body part and a partition wall partitioning a space within the body part; a cassette block which is received in between the partition walls of the box body so as to be attached to the box body; and a connecting part which connects ends of the partition walls adjacent to each other.

With the construction described above, the connecting part continues to an end of the partition wall which partitions a space within the body part. Therefore, the connecting part is formed between the partition walls which face each other. Therefore, stiffness of the body part, i.e. stiffness of the box body is improved to make the body part, i.e. the box body be hardly deformed, and the body part, i.e. the box body is hardly deformed upon molding. Accordingly, the cassette block, which mounts electric components, can be easily attached to between the partition walls of the body part.

Since the connecting part continues to the end of the partition wall, therefore even if such a connecting part connecting the partition walls each other is provided, the cassette block can be received in between the partition walls without badly affecting the cassette block. Accordingly, a cassette block of an electric junction box, which is not provided with such a connecting part and has been used conventionally, can be used.

The electric junction box is provided with a plurality of the connecting parts.

With the construction described above, the body part, i.e. the box body is hardly deformed, therefore the cassette block, which mounts electric components, can be easily attached to between the partition walls of the body part.

The connecting part is formed in a flat plate-shape in such a manner that both surfaces of the connecting part cross both surfaces of the partition walls.

With the construction described above, stiffness of the body part, i.e. stiffness of the box body is securely improved to make the body part, i.e. the box body be hardly deformed, and the body part, i.e. the box body is hardly deformed upon molding. Accordingly, the cassette block, which mounts electric components, can be more easily attached to between the partition walls of the body part.

The connecting part is provided with at least one open window which penetrates through the connecting part.

With the construction described above, electric components can be securely attached to the cassette block through the open window, which is provided at the connecting part.

DESCRIPTION OF THE PREFERRED EMBODIMENTS

Figure 1:
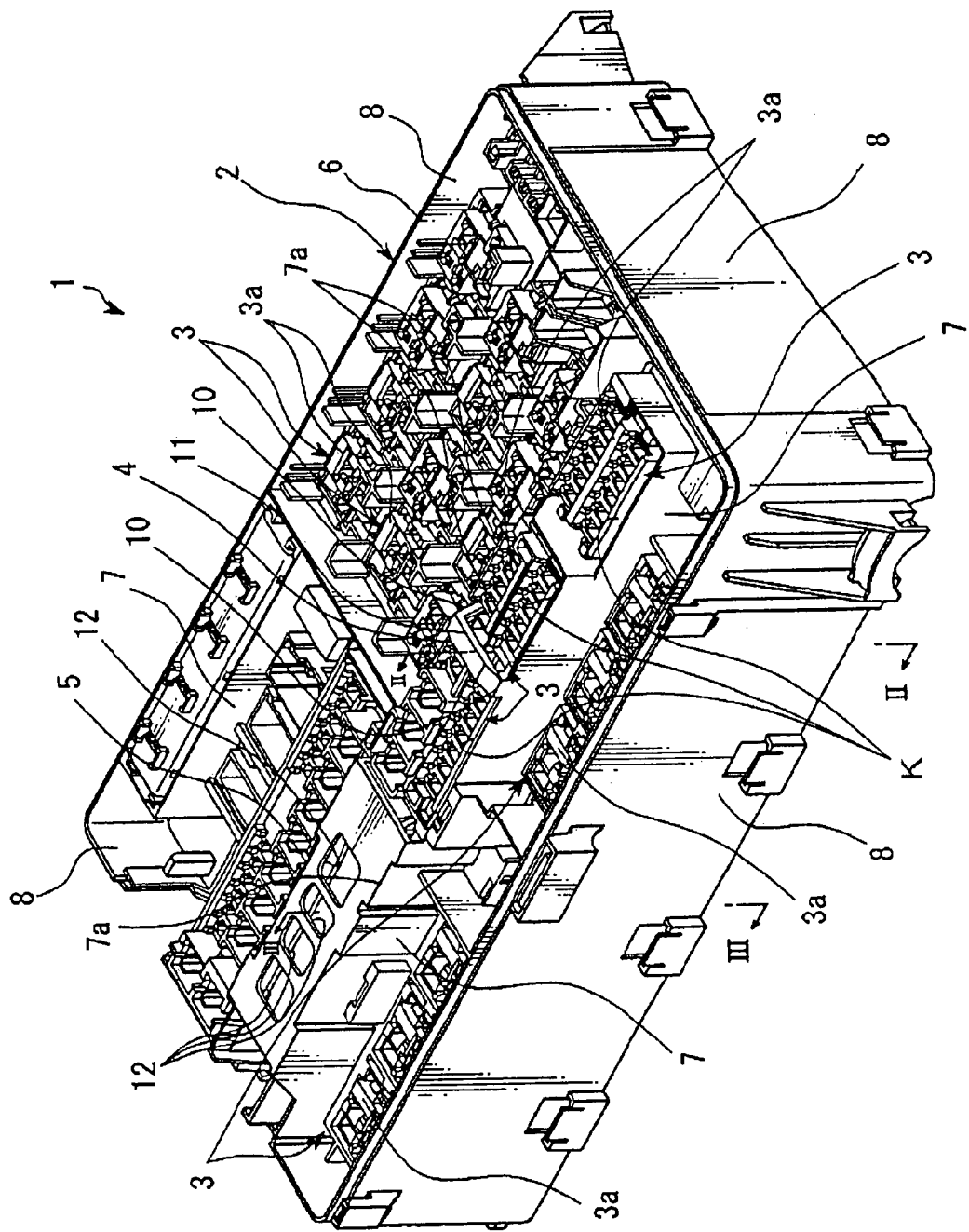
FIG. 1 is a perspective view of an electric junction box according to a preferred embodiment of the present invention.
Figure 2:
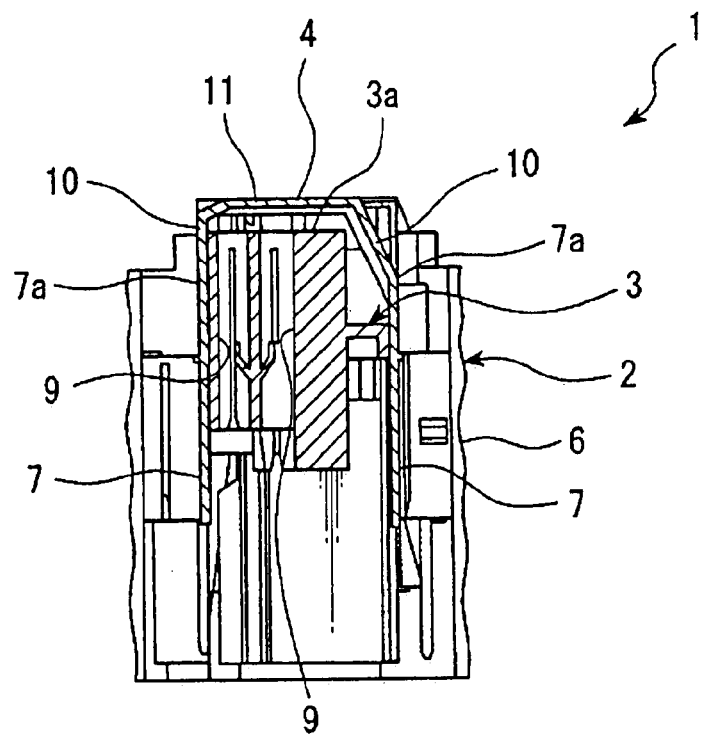
FIG. 2 is a cross sectional view taken along II-II line in FIG. 1.
Figure 3:
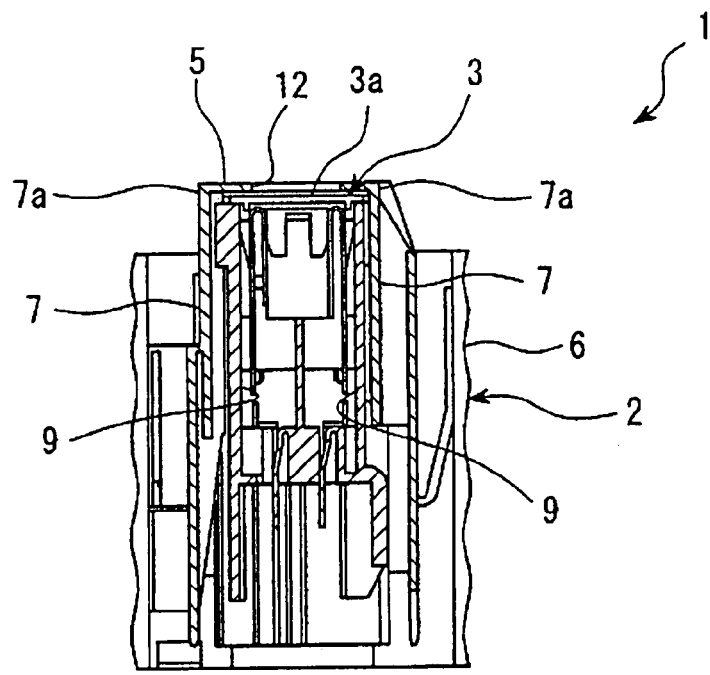
FIG. 3 is a cross sectional view taken along III-III line in FIG. 1.

In the following, an electric junction box according to a preferred embodiment of the present invention will be explained with reference to FIGS. 1-7. An electric junction box 1 according to the preferred embodiment shown in FIG. 1 is mounted on a motor vehicle as a mobile unit. As shown in FIGS. 1-3, the electric junction box 1 includes a box body 2, cassette block 3, connecting beam 4 (shown in FIG. 2) as the connecting part, and connecting wall 5 (shown in FIG. 3) as the connecting part.

Figure 4:
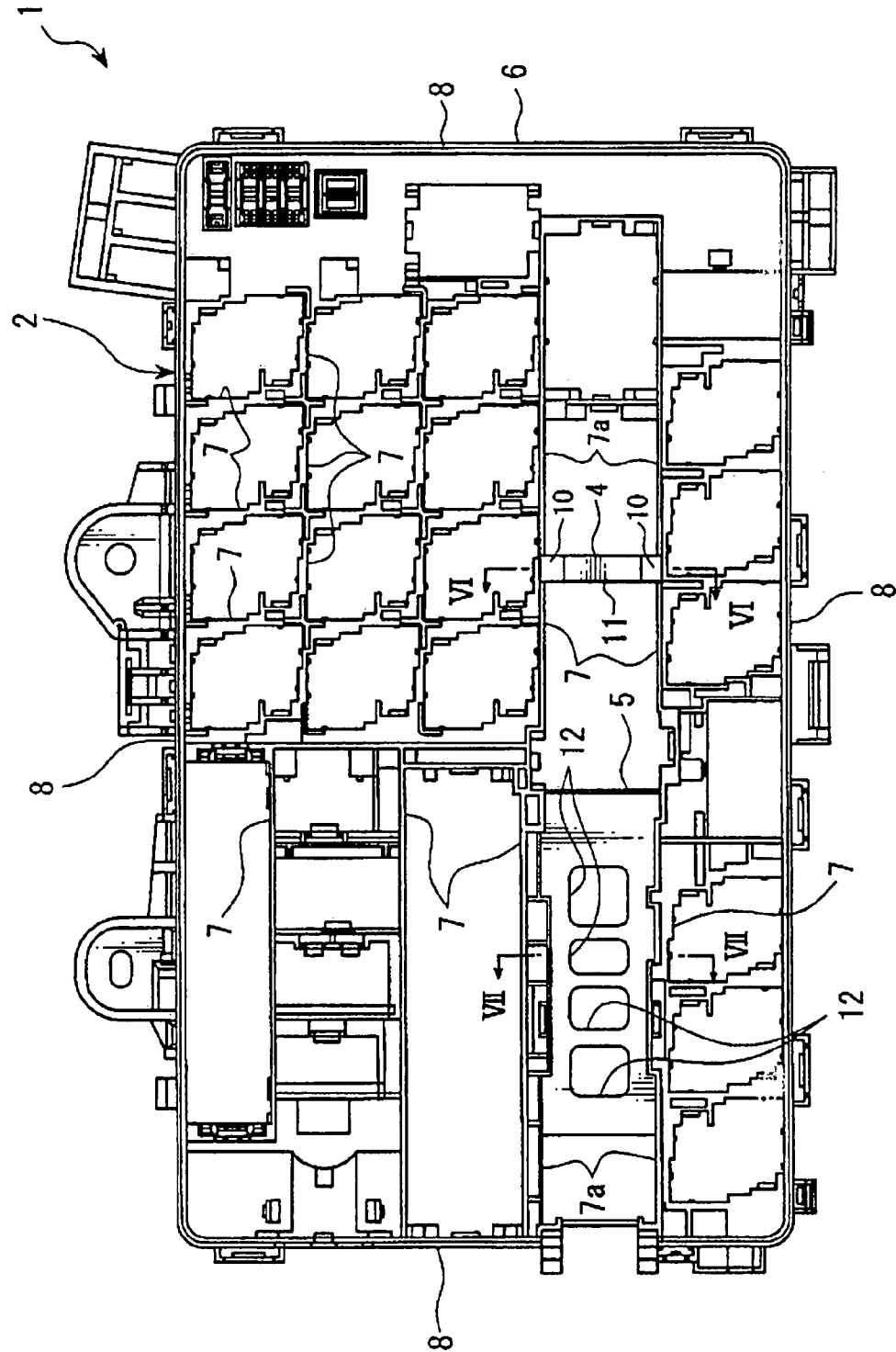
FIG. 4 is a plan view of a box body of the electric junction box shown in FIG. 1.
Figure 5:
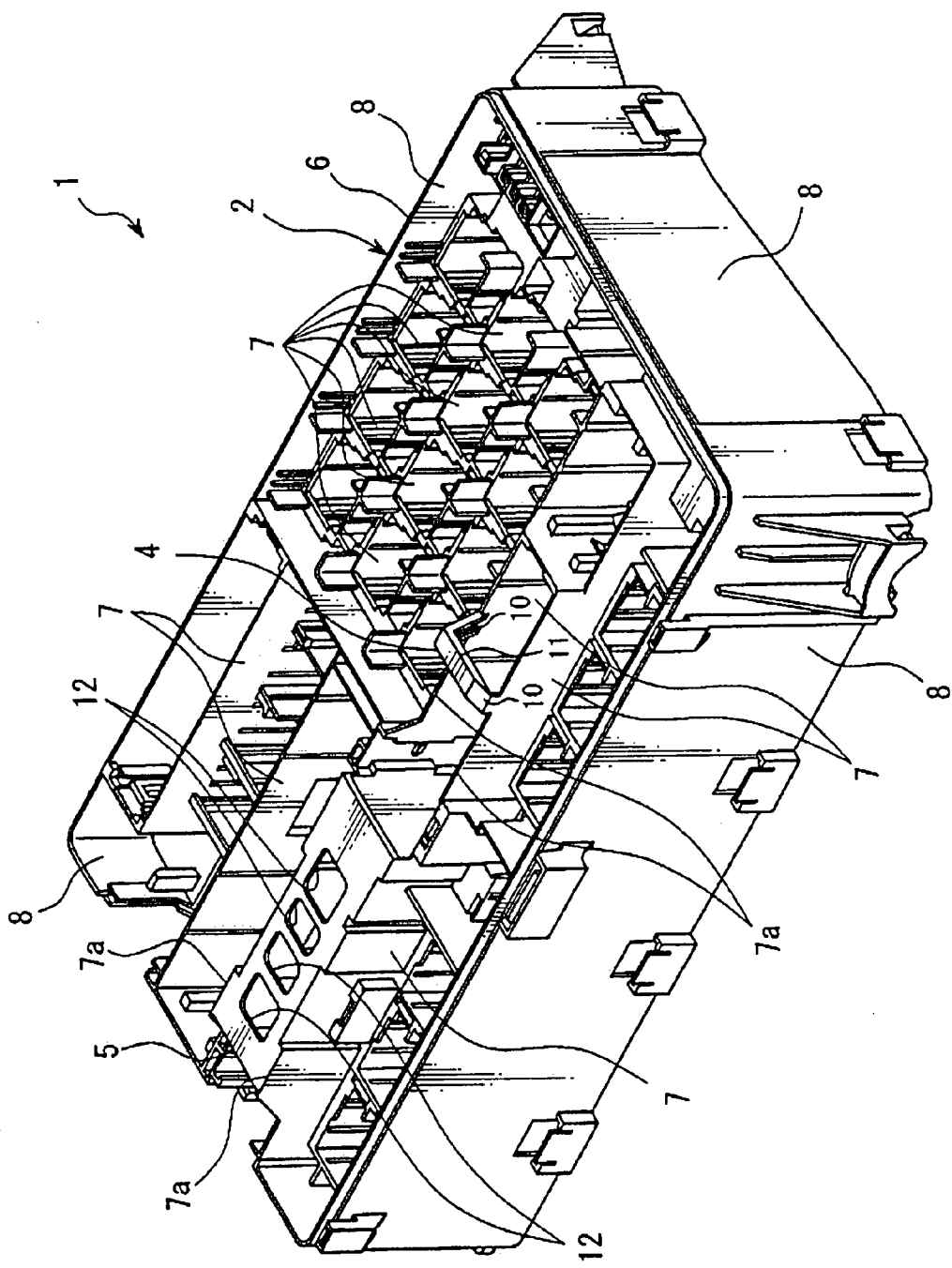
FIG. 5 is a perspective view of the box body of the electric junction box shown in FIG. 4.

The box body 2 is made of electrically insulating synthetic resin and formed by a known injection molding. As shown in FIGS. 4 and 5, the box body 2 includes a body part 6 and a plurality of partition walls 7. The body part 6 is formed in a frame-shape (box-shape) by a plurality of outer walls, ends of which continue to each other. The partition walls 7 continues to inner surfaces of outer walls 8 which construct the body part 6 and partition a space within the body part 6 into a number of spaces. The partition wall 7 extends along both surfaces of the outer wall 8 and is arranged within the box body 6 in a lattice-shape. The space between the partition wall 7 and the outer wall 8 is opened at both ends thereof situated up and down in FIGS. 1 and 5. An inner surface of the partition wall 7 and the outer wall 8 is provided with a mating engaging part (not shown in the figure) with which an engaging part (explained later on) of the cassette block 3 engages.

A plurality of the cassette blocks 3 are provided. Each cassette block 3 is formed in a box-shape receivable within the space surrounded by the partition wall 7 and the outer wall 8. The cassette block 3 is inserted into the space through an opening situated at the lower side of the space in FIGS. 1 and 5.

As shown in FIGS. 2 and 3, the cassette block 3 includes a plurality of terminal receiving chambers 9 and the engaging part (not shown in the figure). The terminal receiving chamber 9 is a straight space formed in the cassette block 3. The longitudinal directions of the terminal receiving chambers 9 are formed in parallel to each other and are parallel to a direction in which the cassette block 3 is inserted into the space described above. In FIGS. 1 and 5, both ends of the terminal receiving chamber 9 situated up and down are opened.

The engaging part is formed projecting from an outer surface of the cassette block 3 and engages with the mating engaging part of the box body 2. The cassette block 3 is inserted into the space described above through the opening described above. When the engaging part engages with the mating engaging part, the cassette block 3 is fixed to the box body 2 as shown in FIGS. 2 and 3. Thus, the cassette block 3 is fixed to the box body 3 on a condition that the cassette block 3 is received in the space described above.

The cassette block 3 receives a terminal fitting attached to an end of an electric wire in the terminal receiving chamber 9 thereof. One surface 3a of the cassette block 3 located at a rear end in the insertion direction into the space mounts electric components such as a relay, fuse and fusible link (not shown in the figure). The terminal fitting is connected to the electric component such as a relay, fuse and fusible link. That is, the terminal fitting electrically connects the electric wire to the electric component.

Figure 6:
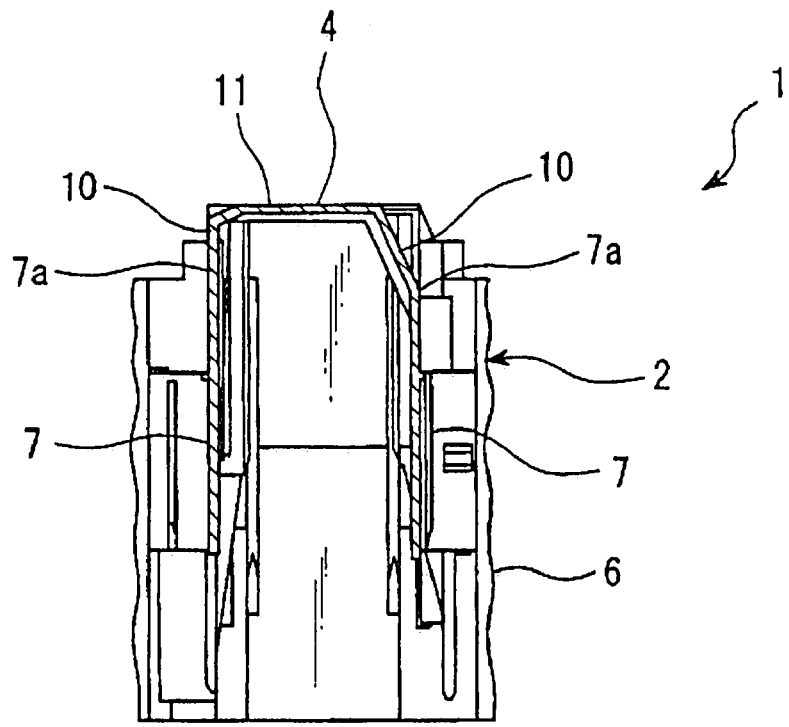
FIG. 6 is a cross sectional view taken along VI-VI line in FIG. 4.

In an example shown in the figure, one connecting beam 4 is provided. As shown in FIGS. 2 and 6, the connecting beam 4 is provided with a pair of rising-up parts 10 and a bar-shaped part 11. The rising-up parts 10 rise up along both surfaces of the partition walls 7 from ends 7a located at the rear in the insertion direction of a pair of the partition walls 7 into the space of the cassette block 3, wherein the partition walls 7 are parallel to each other facing each other having a distance therebetween and the cassette block 3 is positioned between the pair of the partition walls 7.

That is, the rising-up part 10 rises up in a direction leaving the cassette block 3 from the end 7a of the partition wall 7. The bar-shaped part 11 is formed in a shape of a bar extending straight. The bar-shaped part 11 extends in a direction crossing at right angles both surfaces of the partition walls 7 and connects the pair of the rising-up parts 10 to each other. Thus, the connecting beam 4 connects the ends 7a of the partition walls 7 adjacent to each other.

Figure 7:
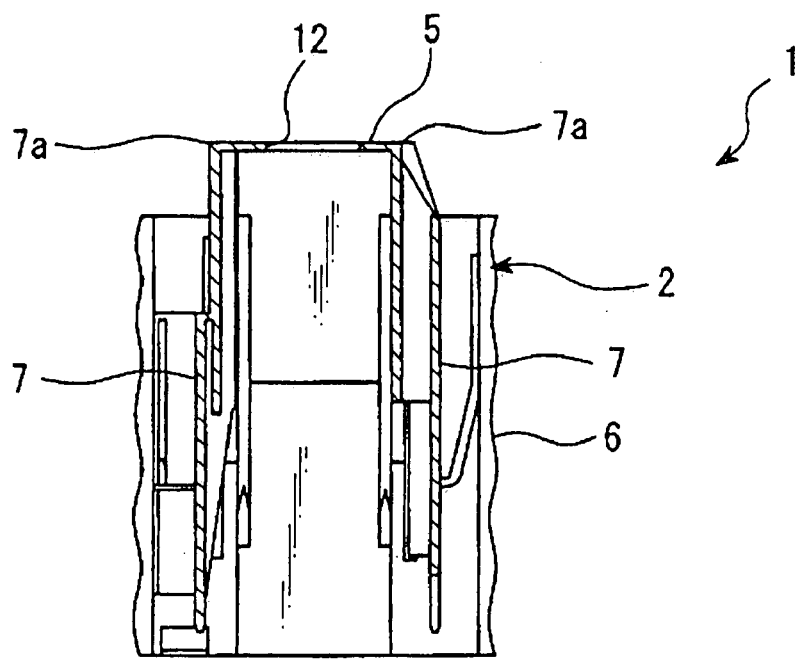
FIG. 7 is a cross sectional view taken along VII-VII line in FIG. 4.

In an example shown in the figure, one connecting wall 5 is provided. As shown in FIGS. 3 and 7, the connecting wall 5 is formed in a flat plate-shape. The connecting wall 5 continues to the ends 7a located at the rear in the insertion direction of a pair of the partition walls 7 into the space of the cassette block 3, wherein the partition walls 7 are parallel to each other facing each other having a distance therebetween and the cassette block 3 is positioned between the pair of the partition walls 7. Both surfaces of the connecting wall 5 cross (cross at right angles in an example shown in the figure) both surfaces of the partition walls 7. Thus, the connecting wall 5 connects the ends 7a of the partition walls 7 adjacent to each other, and the connecting wall 5 is formed in a shape of a flat plate in such a manner that both surfaces of the connecting wall 5 cross both surfaces of the partition walls 7.

The connecting wall 5 is provided with a plurality of open windows 12. The open window 12 is a hole which penetrates through the connecting wall 5. A plurality of the open windows 12 are arranged along the longitudinal direction of the connecting wall 5 having a distance therebetween. The open window 12 positions an opening part of the terminal receiving chamber 9 of the cassette block 3 inside. Therefore, the open window 12 allows a terminal of the electric component, which is attached to the cassette block 3, to pass inside, so as to allow the terminal, i.e. the electric component to be attached to the cassette block 3.

Thus, the electric junction box 1 includes two (i.e. a plurality of) connection parts 4 and 5.

The electric junction box 1 is assembled as follows: First, the electric wires are attached to the respective terminal fittings. Then, each terminal fitting is inserted into the terminal receiving chamber 9 through the opening. Thereafter, each cassette block 3 is inserted into the space described above and the engaging part engages with the mating engaging part, so that the cassette block 3 is mounted in the box body 2. Thereafter, desired electric components such as a relay, fuse and fusible link are mounted to the respective cassette blocks 3.

The electric junction box 1 is received within a waterproof case (not shown in the figure) and fixed to a panel or the like, which constructs a body of a motor vehicle. The electric wires are connected to various electronic instruments mounted on the motor vehicle. Thus, the electric junction box 1 is mounted on the motor vehicle so as to electrically connect the various electronic instruments mounted on the motor vehicle to the various electric components according to a predetermined pattern.

According to the preferred embodiment described above, the connecting beam 4 and the connecting wall 5 continue to the end 7a of the partition wall 7 which partitions the space within the body part 6. Therefore, the connecting beam 4 and the connecting wall 5 are put between the partition walls 7 which face each other. Therefore, stiffness of the body part 6, i.e. box body 2 is improved, so that the body part 6, i.e. box body 2 is hardly deformed, for example, upon molding. Thus, since the box body 2 is hardly deformed, therefore the cassette block 3, which mounts the electric components, can be easily received in between the partition walls 7 of the body part 6 and mounted to the box body 2.

Since the connecting beam 4 and the connecting wall 5 continue to the end 7a of the partition wall 7, the cassette block 3 can be received in between the partition walls 7, between which the connecting beam 4 and the connecting wall 5 are put without affecting the cassette block 3 (i.e. without changing a shape of the cassette block 3) even if the connecting beam 4 and the connecting wall 5, which connect the partition walls 7 to each other, are provided. Therefore, a cassette block 3 of an electric junction box used conventionally, in which the connecting beam 4 and the connecting wall 5 are not provided, can be utilized as it is.

Since a plurality of the connecting beams 4 and the connecting walls 5 are provided, the body part 6, i.e. box body 2 is further hardly deformed. Therefore, the cassette block 3, which mounts the electric components, can be more easily received in between the partition walls 7 of the body part 6 and mounted to the box body 2.

Since the connecting wall 5 is formed in a shape of a flat plate crossing the partition wall 7, stiffness of the body part 6, i.e. box body 2 is securely improved, so that the body part 6, i.e. box body 2 is hardly deformed, for example, upon molding. Therefore the cassette block 3, which mounts the electric components, can be more easily received in between the partition walls 7 of the body part 6 and mounted to the box body 2.

Since the connecting wall 5 is provided with the open window 12, therefore the electric components can be securely attached to the cassette block 3 through the open window 12. Therefore, even if the connecting beam 4 and the connecting wall 5 are provided, the mounting of the electric components is not affected. Therefore, the box body 2 can be prevented from enlarging to mount the electric components.

In the preferred embodiment described above, one connecting beam 4 as the connecting part and one connecting wall 5 as the connecting part are provided. However, instead, in the present invention, at least one of the connecting beam 4 as the connecting part and the connecting wall 5 as the connecting part may be provided. That is, in the present invention, at least one connecting part may be provided.

In the preferred embodiment described above, the connecting wall 5 is provided with a plurality of the open windows 12. However, instead, in the present invention, the connecting wall 5 may be provided with only one open window 12. That is, in the present invention, the connecting wall 5 may be provided with at least one open window 12.

The aforementioned preferred embodiments are described to aid in understanding the present invention and variations may be made by one skilled in the art without departing from the spirit and scope of the present invention.

What is claimed is:

1. An electric junction box comprising:
    a box body including a frame-shaped body part having outer walls and a plurality of partition walls partitioning a space within the body part;
    a cassette block which is received in between the partition walls of the box body so as to be attached to the box body; and
    a plurality of connecting parts which extend between and connect ends of adjacent parallel partition walls, with space between each connecting part and the outer walls wherein:
    the plurality of connecting parts include at least one connecting wall formed in a flat plate-shape such that the connecting wall crosses adjacent parallel partition walls, and at least one connecting beam connecting ends of other adjacent parallel partition walls, the connecting beam having a pair of rising-up parts, rising up along surfaces of the adjacent parallel walls, and a bar shaped part connecting the pair of rising-up parts.

2. The electric junction box according to claim 1, wherein the connecting wall is formed in such that both surfaces of the connecting part cross both surfaces of the partition walls.

3. The electric junction box according to claim 2, wherein the connecting wall is provided with at least one open window which penetrates through the connecting wall.

* * * * *